United States Patent [19]

Bryant et al.

[11] 4,425,010

[45] Jan. 10, 1984

[54] FAIL SAFE DYNAMOELECTRIC MACHINE BEARING

[75] Inventors: Roger A. Bryant, Commerce; David R. Riggenbach, Watkinsville, both of Ga.

[73] Assignee: Reliance Electric Company, Cleveland, Ohio

[21] Appl. No.: 206,153

[22] Filed: Nov. 12, 1980

[51] Int. Cl.³ .................... F16C 19/10; F16C 19/52
[52] U.S. Cl. ............................. 308/227; 308/230; 308/1 A
[58] Field of Search .............. 308/1 A, 230, 227, 35, 308/233, 231, 189 R, 1 R; 384/102

[56] References Cited

U.S. PATENT DOCUMENTS

| 1,175,415 | 3/1916 | Egbert | 384/102 |
| 3,854,781 | 12/1974 | Biltsen | 308/35 |
| 4,015,882 | 4/1977 | Stenert | 308/35 |
| 4,058,353 | 11/1977 | Frommlet et al. | 308/1 A |

*Primary Examiner*—Lenard A. Footland

*Attorney, Agent, or Firm*—Pearne, Gordon, Sessions, McCoy, Granger & Tilberry

[57] ABSTRACT

A bearing fail-safe type dynamoelectric machine is provided with first and second bearings at one end of the machine. The machine is shown as a vertical shaft machine with both bearings capable of carrying the longitudinal thrust due principally to the weight of the rotor and shaft. The first bearing is mounted in a seat in the frame and rotatably journals the shaft under normal running conditions. The second bearing is adjacent to the first and positioned above it, and is in an idling condition or nonload-bearing condition by being radially and longitudinally spaced from the seat in the frame. If the first bearing should fail, then the shaft will drop slightly, due to gravity and applied external forces, and the second bearing will become enabled, rotatably journaling the shaft. This will establish a fail-safe bearing construction in the dynamoelectric machine. The foregoing abstract is merely a resume of one general application, is not a complete discussion of all principles of operation or applications, and is not to be construed as a limitation on the scope of the claimed subject matter.

10 Claims, 2 Drawing Figures

FAIL SAFE DYNAMOELECTRIC MACHINE BEARING

BACKGROUND OF THE INVENTION

Dynamoelectric machines are subject to a number of failures, one source of trouble being the bearings which journal the shaft and rotor for rotation. Rollable element bearings, such as ball bearings, are generally quite reliable, and it has been found that the few failures which occur generally occur because a small particle of metal or other abrasive material somehow is introduced into the ball bearing. Once a small metal chip is knocked out of either the ball or the inner or outer race, this rather quickly causes progressive failure, with additional chips being rapidly produced to grind all of the balls or races and provide complete failure of the bearing.

In some applications, such as a desert location of an oil pipeline motor-driven pump, it is extremely difficult to keep particles of sand from somehow getting into the lubricant grease of the bearing. Even though the motor is a totally enclosed type, foreign matter may be introduced at the time of regreasing since, under such difficult environmental conditions, contaminating particles may get into the grease before it is introduced into the motor or the grease gun or may get on the grease nipple.

A number of motors, such as vertical shaft motors, are mounted to drive crude oil pumps, and such pumps have a seal to prevent leakage of the crude oil being pumped. However, upon failure of a bearing in the motor, the shaft may drop, due to gravity, and even a small drop of as little as 0.030 inch may rupture or cause failure of the seal in the pump. This could permit the escape of volatile fluid, which, if it should hit the hot motor, could cause a fire. If the pump and motor are at an unattended location, such fire could rage uncontrolled for many hours before the oil flow in the pipeline was stopped.

For use in these conditions or other similar difficult environmental conditions, motor customers have, on many occasions, requested a motor be furnished which eliminated or minimized the possibility of such hazard. The prior art method of counteracting such possibility was to either specify an extra high thrust bearing in the vertical shaft motor or in some way to specify a motor with bearings which were over-designed for the expected load. The problem was therefore met by trying to design very conservatively for any and all expected load conditions, and even extremely severe load conditions. The difficulty with such an attempted solution was that even with oversized bearings or extra high thrust bearings, they still could be ruined by the introduction of foreign matter.

SUMMARY OF THE INVENTION

The problem to be solved therefore is how to construct a motor or other dynamoelectric machine wherein a bearing fail-safe construction is achieved so that a dangerous condition of the motor-driven load may be avoided even if a bearing failed in the dynamoelectric machine. This problem is solved by a bearing fail-safe dynamoelectric machine comprising in combination a frame, a stator in said frame, a rotor having a shaft, bearing means journaling said shaft in said frame for cooperation of said rotor with said stator, a first seat in said frame at one end thereof, said bearing means including a first bearing mounted in said seat, said first bearing journaling said shaft for transmission of the force of gravity and applied external forces on said rotor through said shaft and said first bearing to said frame seat, a second bearing surrounding said shaft, a second seat in said frame for cooperation with said second bearing, means establishing said second bearing idling and nonload-bearing under normal machine operating conditions, and whereby upon a failure of said first bearing the rotor and shaft may move downwardly by gravity to nullify said idling means and establish said second bearing rotatably journaling said shaft to transmit the force of gravity on said rotor through said second bearing to said frame second seat.

Accordingly, an object of the invention is to provide a fail-safe bearing for a dynamoelectric machine.

Another object of the invention is to provide a first bearing journaling a dynamoelectric machine and a second bearing which is disabled and only becomes enabled to journal the rotor of the dynamoelectric machine if and when the first bearing fails.

Another object of the invention is to provide a first and a second bearing in a dynamoelectric machine wherein the first bearing journals the rotor and the second bearing has a clearance relative to a seat in the frame of the machine so that this second bearing is disabled and only becomes enabled if the shaft drops due to gravity and that due to failure of the first bearing.

Other objects and a fuller understanding of the invention may be had by referring to the following description and claims, taken in conjunction with the accompanying drawing.

DESCRIPTION OF THE PREFERRED EMBODIMENTS

Figure 1:
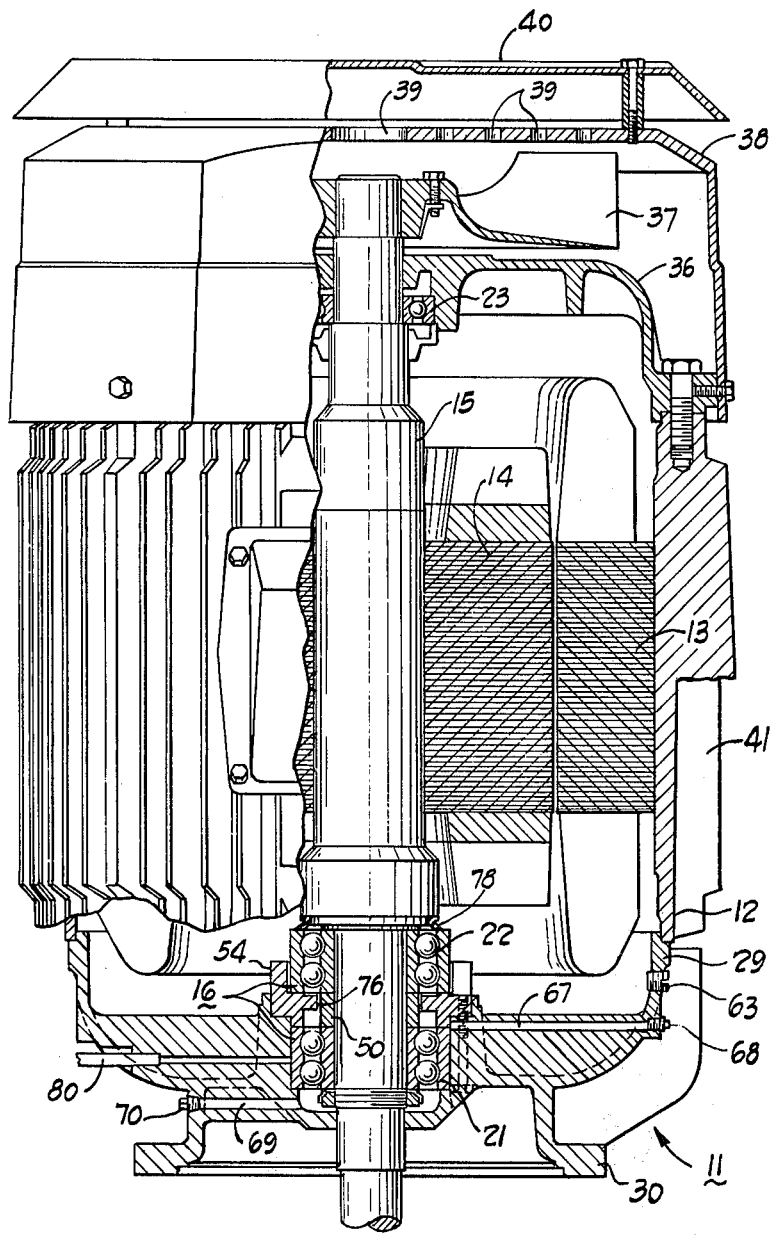
FIG. 1 is a front elevational view, partly in section, of a dynamoelectric machine embodying the invention.
Figure 2:
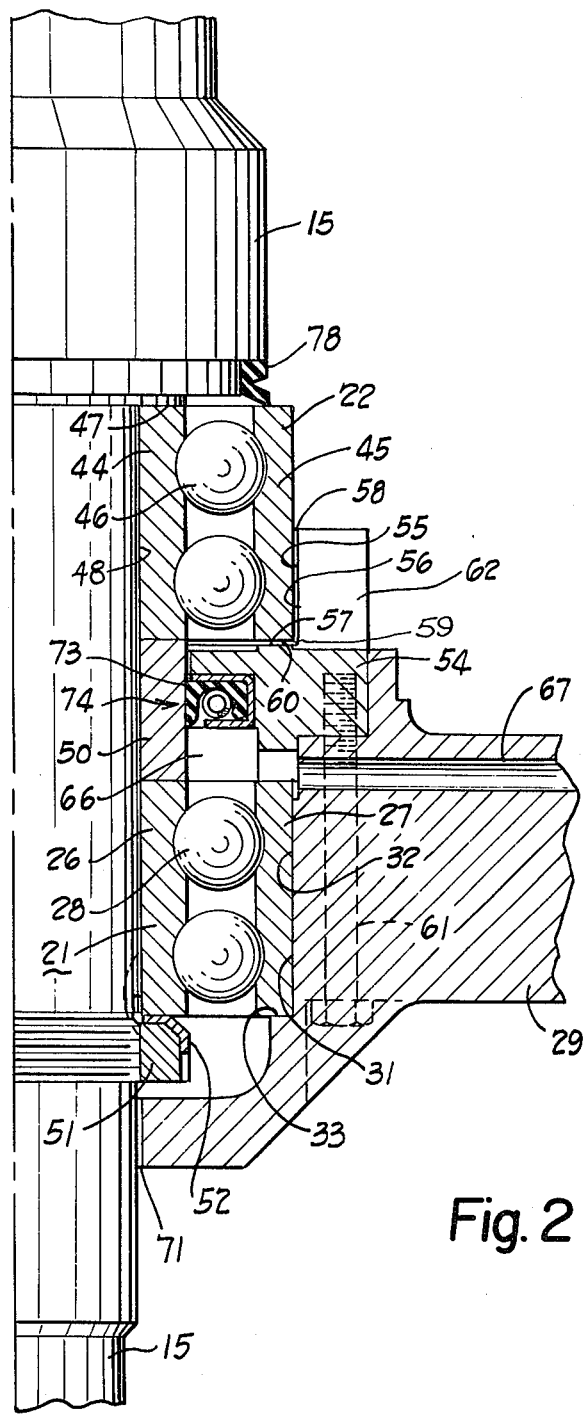
FIG. 2 is an enlarged, partial sectional view of first and second bearings in the machine of FIG. 1.

The drawing illustrates a dynamoelectric machine 11 which may be a generator but is illustrated as a motor having a frame 12 which carries a fixed, magnetically permeable stator 13. A magnetically permeable rotor 14 cooperates with the stator 13 by being secured on a shaft 15 which is journaled in the frame 12. Bearing means 16 are provided which includes a first bearing 21, a second bearing 22, and a third bearing 23. The bearings 21 and 23 are adapted to journal the shaft 15 and the second bearing 22 provides a fail-safe bearing construction should the first bearing 21 fail for any reason. The machine 11 is illustrated as a vertical shaft machine, and hence the bearing means 16 is a bearing to resist the longitudinal force, namely, it includes one or more thrust bearings. In the construction shown, both the first and second bearings 21 and 22 are double-row ball bearings which are capable of journaling the shaft 15 for any radial loads and also of journaling it for longitudinal thrust.

The first bearing 21 has an inner race 26, an outer race 27, and balls 28. The frame 12 includes an end bell 29 which has a flange 30 for mounting to a load such as a motordriven pump. The end bell 29 has a first seat 31 which includes a longitudinal wall 32 and a lateral shoulder 33. The inner race 26 is closely received on the shaft 15, and the outer race 27 is closely received in the seat 31 and in engagement with the radial wall 32 and shoulder 33. In this manner, the first bearing 21 journals the shaft 15, with the inner race 26 rotating with the shaft 15 and the outer race 27 stationary.

The third bearing 23 is provided at the upper end of the motor 11 and is also a ball bearing, in this case a single row ball bearing journaling the upper end of the shaft 15 relative to an end bell 36 which is secured to the upper end of the frame 12.

The machine 11 is illustrated as a totally enclosed fan-cooled motor, and the upper end of the shaft 15 has secured thereto a centrifugal fan 37 rotating within a shroud 38. Air intake apertures 39 are provided at the upper end of the shroud 38 covered by a cover 40. The shroud directs air downwardly over fins 41 on the frame 12 for the cooling of the motor or machine 11.

The second bearing 22 includes an inner race 44, an outer race 45, and balls 46 between the two races. A bearing seat 48 for the bearing 22 is provided on the shaft 15 including a shoulder 47 on the shaft. A spacer bushing 50 is closely received on the shaft 15 between the first and second bearings 21 and 22. A nut 51 and lock washer 52 secure the first and second bearings 21 and 22 in position on the shaft 15.

A spacer cup 54 surrounds the spacer bushing 50 and is provided with a second seat 55 for cooperation with the second bearing 22. This second seat 55 includes a longitudinal wall 56 and a lateral shoulder 57. In normal use, there is a slight radial spacing or clearance 58 between inner race 44 of the bearing 22 and the bearing seat 48, or, as shown, between the outer cylindrical surface of the outer race 45 and the longitudinal wall 56. This radial clearance may be in the order of 0.010 inch, and there is a small longitudinal clearance 59 between the inner race 44 and the shaft shoulder 47 or, as shown, between the lower end 60 of the outer race 45 and the lateral shoulder 57. Again, this longitudinal clearance may be in the order of 0.010 inch. The spacer cup 54 is secured in position in the end bell 29 by a plurality of, such as three, cap screws 61. A milled slot 62 at one point on the periphery of the spacer cup 54 permits inspection of the longitudinal clearance 59. This inspection may be aided by a removable plug 63 in the end bell 29.

A lubricant chamber 66 is provided for the first bearing 21. A lubricant entrance 67 is provided to this chamber closed by a plug 68, and a lubricant excess drain 69 is provided, closed by a plug 70. A lube excess clearance 71 is provided at the lower end of the end bell 29 relative to the shaft, and a lube seal 73, urged by a garter spring 74 into engagement with the spacer bushing 50, is provided in the spacer cup 54. Lube seal 73 is optional and FIG. 1 shows an alternative construction with the absence of such lube seal, and in its place the spacer cup 54 has a small radial clearance 76 in the order of 0.020 inch relative to the spacer bushing 50. A lube seal 78 is provided at the upper end of the second bearing 22 relative to a shoulder on the shaft 15.

A bearing failure detector 80 is provided to detect the possible failure of the first bearing 21. This may be a resistance temperature detector, a shock meter which measures the high frequency vibrations, or a physical displacement sensor, to indicate that the bearing is failing or has failed. Any of these may be used to sound an alarm or to shut down the motor, as desired. If a physical displacement sensor is used to sense bearing failure, it would be located to sense the position of the shaft relative to the frame.

Operation

The fail-safe bearing design of the present invention may be used in many different types of dynamoelectric machines. It has been illustrated as being used in a vertical shaft motor which has a flange mounting 30 adapted to be connected to a pump, as an example of a load. Many such pumps have a shaft seal which will not tolerate much axial movement, otherwise the seal will rupture. In one particular pump usage, such pump may be used to pump crude oil in a desert condition where sand as an abrasive is quite difficult to keep from entering the lubricant chamber 66 of the motor. In the prior art systems, should such abrasive particles enter the bearing and cause bearing failure, then the vertical shaft of the motor could drop an amount in excess of 0.030 inches and this could rupture the seal in the pump. The crude oil could then escape and may cause a fire by coming in contact with the hot motor.

The present invention overcomes this difficulty. The motor 11 operates normally using the first bearing 21 at the lower end and the third bearing 23 at the upper end of the shaft to journal the shaft. Relubrication of the bearings on a periodic basis is normally recommended and despite extreme precautions under difficult environmental conditions, particles of sand or other abrasive particles may somehow enter the motor, either by being on the grease nipple or by being blown into the grease gun before it can be covered upon reloading the grease gun. If such abrasive particles should enter the lubricant chamber 66, they can migrate downwardly due to gravity and may cause failure of the first bearing 21. Upon the first metal chip being knocked out of either the balls or the inner or outer races, this provides additional hard particles which can cause progressive failure of such first bearing 21.

If and when the first bearing 21 should fail, then the weight of the rotor and shaft and/or the load on the shaft will cause this shaft to drop vertically downwardly. In such case, the longitudinal clearance 59 between the outer race 45 of the second bearing 22 and the spacer cup 54 will be eliminated. This clearance previously established an idling means which established the second bearing 22 as merely idling, that is, not being loaded in any way. The longitudinal clearance 59 eliminated any thrust load being carried by the second bearing 22, and the radial clearance 58 eliminated any radial bearing load being carried by the second bearing 22. Now with the failure of the first bearing 21, the shaft will drop and eliminate the longitudinal clearance 59. This may be in the order of 0.010 inches which is within the safe limits of the seal within the pump being driven by the motor 11. Also, the radial clearance 58 may be in the order of 0.010 inches which is within the design limits of the motor 11 so that the rotating rotor 14 will not rub against the stator 13. The motor 11 will then continue to operate to drive the pump without rupturing the pump shaft seal, even though the first bearing 21 has failed. Preferably, it is contemplated that the bearing failure detector 80 would provide some form of indicator or alarm to indicate that the first bearing 21 has failed. This may be further ascertained by visual inspection by removal of the plug 63 to sight or gauge through the milled slot 62 to positively determine this fact of bearing failure. Also, the bearing failure detector 80 may be connected to actually shut down the motor 11 until it can be replaced. This prevents the danger of fires or explosion where the motor is used in a hazardous environment.

The fact that the second bearing 22 is idling, that is, not carrying any load during the normal operation of the motor 11, assures long life of this second bearing 22 and assures that it will be ready to carry the load if and when the first bearing 21 should fail. During this idling of the second bearing 22, all parts of the bearing rotate including the outer race 45 which rotates at the same speed of the shaft 15. Therefore, the initial filling of the grease lubricant within the second bearing 22 will sustain this bearing and it need not be relubricated during the normal life of the motor. This is why the lubricant seal 73 may be provided. If it is not provided, for example, as in the alternative construction in FIG. 1, then the small radial clearance 76 will permit a slight amount of lubricant to be moved upwardly during relubrication intervals as a means for assuring continued lubrication of this second bearing 22. In either case, the spacer cup 54 acts as a shield means between the first and second bearings and between the second bearing 22 and the lube entrance 67.

In the preferred embodiment, the second bearing 22 is provided above the first bearing 21 so that if and when the first bearing 21 should fail, the metal particles from the failed bearing will tend to migrate downwardly due to gravity, rather than to migrate upwardly to possibly contaminate the second bearing 22.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A bearing fail-safe dynamoelectric machine comprising, in combination:
    a frame;
    a stator in said frame;
    a rotor having a shaft;
    bearing means journaling said shaft in said frame for cooperation of said rotor with said stator;
    a first seat in said frame at one end thereof;
    said bearing means including a first bearing mounted in said seat;
    said first bearing journaling said shaft for transmission of the force of gravity and applied external forces on said rotor through said shaft and said first bearing to said frame seat;
    a second bearing surrounding said shaft;
    a second seat in said frame for cooperation with said second bearing;
    means establishing said second bearing idling and nonload-bearing under normal machine operating conditions;
    each of said first and second seats having a lateral shoulder and a longitudinal wall; and
    said first bearing having an outer race mounted in engagement with said shoulder and wall of said first seat;
    whereby upon a failure of said first bearing the rotor and shaft may move downwardly by gravity to nullify said idling means and establish said second bearing rotatably journaling said shaft to transmit the force of gravity on said rotor through said second bearing to said frame second seat.

2. A dynamoelectric machine as set forth in claim 1, including shielding means between said first and second bearings.

3. A dynamoelectric machine as set forth in claim 1, wherein said first and second bearings include thrust bearing surfaces.

4. A dynamoelectric machine as set forth in claim 1, wherein said shaft is disposed vertically, and said first and second seats including laterally disposed shoulders to receive vertically downward forces.

5. A dynamoelectric machine as set forth in claim 1, including means to lubricate both said bearings and having a lubricant passage leading to an area between said first and second bearings.

6. A dynamoelectric machine as set forth in claim 5, wherein said lubricating means including shielding means disposed between said lubricant passage and said second bearing to direct the majority of lubricant to said first bearing.

7. A dynamoelectric machine as set forth in claim 1, wherein said idling means includes said second bearing having an outer race with a small clearance relative to said lateral shoulder.

8. A dynamoelectric machine as set forth in claim 7, wherein said idling means includes said second bearing outer race having a small clearance relative to said longitudinal wall to have said second bearing outer race rotate at the same speed as said inner race under normal conditions.

9. A bearing fail-safe rotary machine comprising, in combination:
    a frame;
    a rotor in said frame and having a vertical shaft;
    a first bearing acting between said frame and said shaft and journaling said shaft for transmission of the force of gravity and applied external forces on said rotor through said shaft to said frame;
    a second bearing surrounding said shaft and vertically spaced from said first bearing;
    said second bearing adapted to act between said shaft and said frame to journal said shaft relative to said frame except for normally operative idling means;
    said idling means including a part of said second bearing being physically spaced from the respective shaft and frame hence establishing said second bearing idling and nonload-bearing under normal machine operating conditions;
    whereby upon a failure of said first bearing the rotor and shaft may move vertically downwardly by gravity to nullify said idling means and establish said second bearing rotatably journaling said shaft to transmit the force of gravity on said rotor through said second bearing to said frame; and
    said second bearing being disposed vertically above said first bearing to have any particles from the disintegration of said first bearing migrate downwardly by gravity away from said second bearing.

10. A bearing fail-safe rotary machine comprising, in combination:
    a frame;
    a rotor in said frame and having a shaft;
    a first bearing engaging said frame and said shaft and journaling said shaft for transmission of the force of gravity and applied external forces on said rotor through said shaft to said frame;

a second bearing surrounding said shaft and physically spaced from said first bearing;

said second bearing having rollable elements engaging first and second opposed bearing races;

said second bearing adapted to journal said shaft relative to said frame except for normally operative idling means;

said idling means including one of said bearing races being physically spaced from the respective shaft and frame so that there is no relative rotation between said races upon rotation of said shaft and hence establishing said second bearing idling and nonload-bearing under normal machine operating conditions;

whereby upon a failure of said first bearing the rotor and shaft may move downwardly by gravity to have said bearing races of said second bearing contact both said shaft and frame to nullify said idling means and establish said second bearing rotatably journaling said shaft to transmit the force of gravity on said rotor through said second bearing to said frame.

* * * * *